Jan. 3, 1939. S. WOLLING 2,142,229

PAY ROLL RECORD DEVICE

Filed Oct. 12, 1936

Inventor
Spencer Wolling
by Ripsey & Cassidy
His Attorneys

Patented Jan. 3, 1939

2,142,229

UNITED STATES PATENT OFFICE 2,142,229

PAY ROLL RECORD DEVICE

Spencer Wolling, University City, Mo.

Application October 12, 1936, Serial No. 105,179

3 Claims. (Cl. 283—66)

This invention relates to payroll record devices.

Objects of the invention are to provide an improved payroll record device comprising sheets of paper assembled together so that the adjacent pages of each two sheets will cooperate to receive the complete payroll records for the period of time to which the sheets are devoted, as well as additional records; to provide means for holding the sheets in assembled relationship so that defined spaces on each two adjacent pages are alined with spaces at the left of the first sheet designed and adapted to receive the names of the employees; and to provide physical structure whereby the free edge of each sheet may be folded along a vertical line to expose the names entered in the marginal column of a preceding sheet, making it unnecessary to enter the names on the margins of the successive sheets excepting when changes in the personnel of the employees are made.

Other objects will be apparent from the following description, reference being made to the annexed drawing, in which—

Fig. 1 is a plan view of two cooperating sheets illustrating important features of the invention.

Fig. 2 is an enlarged plan view of a portion of one of the sheets.

The sheet 1 has one edge attached to holders 2 so that said sheet may be laid flatwise to expose either page thereof. Near the free edge of the second page of the sheet 1 a vertical column of horizontal spaces 3 is formed and is designed to receive the names of the employees. Vertical columns 4 are designated by symbols at the top thereof indicating the days of the week, and are designed to receive records of the daily units or hours worked by the respective employees. Adjacent to the columns 4 and toward the attached edge of the sheet 1 a column 5 is formed to receive records of the total hours or units worked by the respective employees, and an additional column 6 receives records of the rate of payment, whether by hours or by units. Other vertical columns 7 receive records of the wages or remuneration, and a column 8 adjacent to the attached edge of the sheet 1 receives records of the total remuneration received by the respective employees.

The sheet 9 has horizontal spaces therein in alinement with the horizontal spaces on the sheet 1, and one edge of the sheet 9 is attached to the fasteners 2 so that said sheet 9 may be laid flatwise with the horizontal spaces thereon in continuation or in alinement with the respective horizontal spaces on the sheet 1.

Various vertical columns 10, 11, 12, 13, 14, 15, 16, 17, 18, 19, 20, 21, 22 and 23 are provided on the page of the sheet 9 that is toward the sheet 1, and are designed and adapted to receive records as designated at the upper ends of said columns. An additional vertical column 24 is provided at the free edge of the sheet 9 to receive appropriate records appertaining to the respective employees.

The opposite page of sheet 9 is a duplicate of the illustrated page of sheet 1. The sheet 9 has a fold or severance line 25 which registers with the line 26 on sheet 1 when the sheet 9 is laid upon the sheet 1. This fold or severance line may consist of perforations through the sheet 9 so that the marginal portion of the free edge of the sheet 9 may be folded under to expose the names contained in the column 3, making it unnecessary to enter the names on the vertical column of sheet 9 corresponding to the column 3.

It should be apparent that this payroll record device comprising cooperating sheets held together with alined spaces so that they may be turned to the position shown in Fig. 1 or laid one upon the other with the marginal edge of the superimposed sheet folded under or severed, constitutes a facility for practical use and a real convenience. It is unnecessary to duplicate entry of the names upon the respective sheets or to make more than one record of the names excepting when a change in the personnel of the employees occurs. Then the marginal portion 24 of the sheet 2 may be left unfolded or extended in the manner of the marginal portion 3 of the sheet 1 and receive entries of the names of the employees in a like manner in which the names are entered in column 3.

Different columnar spaces may be provided to meet different needs or requirements, and I do not restrict myself unessentially in this or other respects.

I claim:—

1. A payroll record device comprising two sheets, hinges connecting the inner edges of said sheets in book form for swinging movements to open and closed positions, the free edge of the second page of said first sheet having a vertical series of appropriately designated spaces to receive the names of employees, and inwardly from said spaces appropriately designated vertical columns having vertical series of spaces alined with said first named spaces to receive data relating to the respective employees, the first page of the second sheet having appropriately designated vertical columns provided with vertical series of spaces alined with said last named spaces on said first sheet, and the second page of the second sheet being a duplicate of said second page of the first sheet, and the marginal portion of the free edge of the second sheet having a vertical row of perforations throughout the width thereof providing a hinge along which the marginal portion of said second sheet may be folded or severed to expose the names on the second page of the first sheet when said second sheet is superimposed upon said first sheet.

2. A payroll record device comprising two sheets, hinges connecting the inner edges of said sheets in book form for swinging movements to open and closed positions, the free edge of the second page of said first sheet having a vertical series of appropriately designated spaces to receive the names of employees, and inwardly from said spaces appropriately designated vertical columns having vertical series of spaces alined with said first named spaces to receive data relating to the respective employees, the marginal portion of the free edge of the second sheet having a vertical row of perforations in alinement with the inner ends of said first named spaces on said first sheet along which the second sheet may be folded or severed to expose the names on the first sheet when said second sheet is superimposed upon said first sheet, the second page of said second sheet being a duplicate of the second page of the first sheet to receive similar records when said second sheet is superimposed upon the first sheet and has its marginal portion folded or severed along said vertical row of perforations and exposing the names on the first sheet.

3. A payroll record device comprising two sheets, hinges connecting the inner edges of said sheets in book form for swinging movements to open and closed positions, the free edge of the second page of said first sheet having a vertical series of appropriately designated spaces to receive the names of employees, and inwardly from said spaces appropriately designated vertical columns having vertical series of spaces alined with said first named spaces to receive data relating to the respective employees, and the second page of the second sheet being a duplicate of said second page of the first sheet, and the marginal portion of the free edge of the second sheet having a vertical row of perforations throughout the width thereof providing a hinge along which the marginal portion of said second sheet may be folded or severed to expose the names on the second page of the first sheet when said second sheet is superimposed upon said first sheet.

SPENCER WOLLING.